Dec. 22, 1931.  W. L. McRAE ET AL  1,837,626

CONDUIT ANCHORING

Filed Sept. 27, 1929

INVENTORS
Walter L. McRae 2nd
BY Frank F. Kregenow.
Fay, Oberlin & Fay
ATTORNEYS.

Patented Dec. 22, 1931

1,837,626

UNITED STATES PATENT OFFICE

WALTER L. McRAE, OF EUCLID VILLAGE, AND FRANK F. KREGENOW, OF CLEVELAND, OHIO

CONDUIT ANCHORING

Application filed September 27, 1929. Serial No. 395,638.

In the customary practice, in installations involving the placement of electric wiring conduits and junction boxes or outlet boxes in building construction of concrete and the like, it is a matter of considerable difficulty to place and maintain the conduit ends in the boxes such that misplacement may not occur in the applying of the concrete. Where there is much reenforcement in the way and the conduits have to be brought for instance to an outlet box in the ceiling, it very frequently happens that the conduit end will spring away from the box and be embedded in the concrete in such malposition. It then becomes necessary on discovering the condition, to chisel out the concrete sufficiently to free the conduit end to allow reassembly with the box. All this requires a large amount of extra work, and refilling or plastering about the damaged portion.

A means and procedure making possible an easy and positive maintenance of the proper position of conduit ends and boxes irrespective of subsequent masonry operations on the ceilings or walls concerned, is accordingly fundamentally important and highly desirable.

To the accomplishment of the foregoing and related ends, the invention, then, consists of the features hereinafter fully described, and particularly pointed out in the claims, the following description and the annexed drawings setting forth in detail certain embodiments of the invention, such being illustrative however of but one of the various ways in which the principle of the invention may be employed.

In said annexed drawings:—

Figure 1:
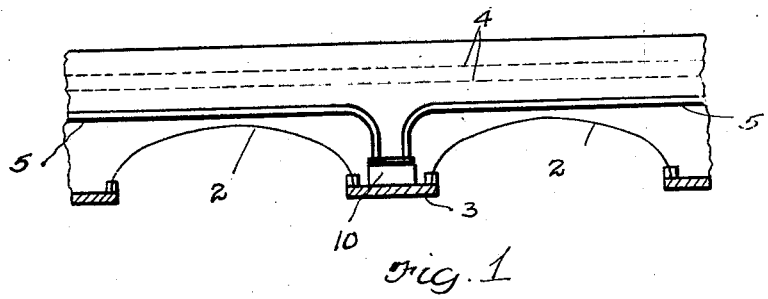
Figure 2:
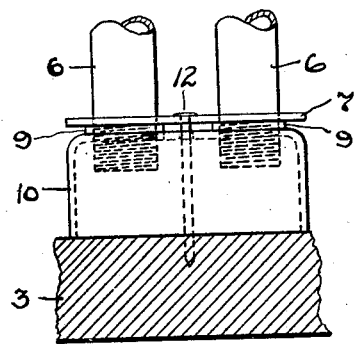
Figure 3:
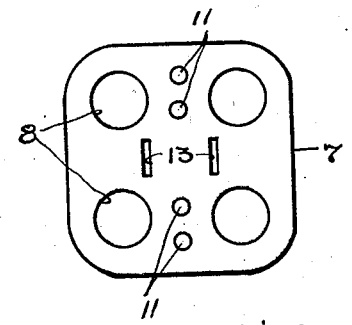
Figure 4:
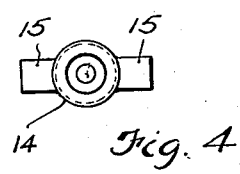
Figure 5:
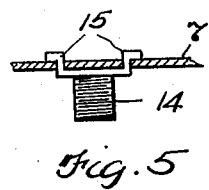

Fig. 1 is a fragmentary sectional view showing a ceiling construction embodying the invention; Fig. 2 is an enlarged detail thereof; Figs. 3 and 4 are plan views of details; and Fig. 5 is a detail in section.

Referring more particularly to the drawings, there is shown a portion of a ceiling under construction, molds or formers 2 being positioned in relation with support formers 3, which may be of wood; and reenforcing elements 4 being variously placed as desired, preparatory to receiving the concrete or other masonry material. Electric wiring conduits 5 in suitable position have their ends 6 brought into relation with an anchor element, preferably in the form of a plate 7 having holes 8 to receive the conduit ends; and thin nuts 9 on them being run up onto the screw threaded ends of the conduits secure the same to the plate. With the conduit ends connected to the anchor plate, it then becomes a simple matter to bring the plate and conduit end assembly, with such slight movement as may be necessary, into apposition with a conduit box 10, the threaded ends of the pipes seating into the openings in the box. A fastening means may now be applied to hold the assemblage in desired position. For this, preferably the plate 7 is provided with holes 11 such that one or more nails or the like 12 may be driven down through the plate 7 and through the box 10 into the plank or centering support 3. The box and conduit assemblage is then ready for the application of the concrete or other masonry material.

Desirably, the anchor plate 7 is provided also with an opening or openings as for instance slots 13 for a fixture-stud 14. This may be screw threaded, and may be fastened to the plate 7 by suitable means, for instance by lugs 15 seating through the slots 13. The lugs 15 being headed over, then serve to hold the fixture stud, and when the anchor plate is brought into apposition with the conduit box, the fixture stud may project therein through a corresponding opening in the box.

When the concrete or other masonry material is set, the centering or molding equipment 2, 3, is removed, and the conduit box 10 is found embedded in the concrete, with the screw threaded conduit ends and the fixture stud projecting into the box. It is then a simple matter to apply nuts to the conduit ends within the box if desired, and attach the fixture to the fixture stud 14 and complete the wiring connections.

While we have described the invention illustratively as applied to a concrete ceiling construction, it will be understood that it is applicable generally where conduit ends are to be asembled with boxes in any situation where there is difficulty of access to the face of the box during the stages of installation before the masonry work is completed; and by means of the present invention it becomes possible to not only facilitate the rapid placement of the electrical conduit installation, but such installation is effectively secured against accidental displacement during the subsequent masonry operations. Moreover, after the latter are completed, the finishing of the electrical connections and applying the fixtures is rendered simple and free from complication.

Other modes of applying the principle of the invention may be employed, change being made as regards the details disclosed, provided the means or steps stated in any of the following claims, or the equivalent of such, be employed.

We therefore particularly point out and distinctly claim as our invention:—

1. In construction of the character described, in combination with a conduit-box having conduit-receiving holes and nail-holes in its base, a conduit-assembling plate having conduit-receiving holes to register with the conduit-receiving holes, and nail-holes to register with such nail holes of the conduit-box.

2. In building a conduit system of the character described, axially inserting conduit-ends through retaining-holes in an assembling plate, apposing the plate with the assembled group of conduits in register-relation to project into corresponding holes in a conduit-box, and securing the plate and conduits and box together by driving a fastening element in common through the registering nail-holes in the plate and box.

Signed by us this 21 day of September, 1929.

WALTER L. McRAE.
FRANK F. KREGENOW.